United States Patent [19]

Longworth et al.

[11] Patent Number: 4,689,201

[45] Date of Patent: Aug. 25, 1987

[54] PREVENTION OF CORROSION

[75] Inventors: Stuart W. Longworth, Warrington; John G. Baker, Cheshire, both of England

[73] Assignee: Dearborn Chemicals Limited, Widnes, England

[21] Appl. No.: 708,303

[22] Filed: Mar. 5, 1985

[30] Foreign Application Priority Data

Mar. 6, 1984 [GB] United Kingdom ................. 8405860

[51] Int. Cl.$^4$ .............................................. C23F 11/00
[52] U.S. Cl. .................................. 422/16; 252/389.52; 252/390; 422/14; 422/19
[58] Field of Search ............................. 422/14, 16, 19; 252/389.1, 392, 393, 390, 389.52; 210/698

[56] References Cited

U.S. PATENT DOCUMENTS

| | | | |
|---|---|---|---|
| 3,256,203 | 6/1966 | Robertson et al. | 252/173 |
| 3,837,803 | 9/1974 | Carter et al. | |
| 3,989,637 | 11/1976 | Hogue et al. | 422/16 |
| 4,209,487 | 6/1980 | Hogue et al. | 422/16 |
| 4,350,606 | 9/1982 | Cuisia et al. | 252/392 |
| 4,389,371 | 6/1983 | Wilson et al. | 422/16 |
| 4,501,667 | 2/1985 | Cook | 422/7 |

FOREIGN PATENT DOCUMENTS

| | | |
|---|---|---|
| 802875 | 10/1958 | United Kingdom . |
| 1174829 | 12/1969 | United Kingdom . |
| 1244123 | 8/1971 | United Kingdom . |
| 1423920 | 2/1976 | United Kingdom . |
| 1559725 | 1/1980 | United Kingdom . |

Primary Examiner—Barry S. Richman
Assistant Examiner—William R. Johnson
Attorney, Agent, or Firm—David E. Heiser

[57] ABSTRACT

Corrosion in liquid, especially aqueous systems such as cooling systems, is controlled by the addition of a vegetable tannin or a derivative thereof, a triazole, a hydroxylamine, a neutralizing amine, and a water soluble salt of a Group II metal, in particular zinc, magnesium or calcium.

66 Claims, No Drawings

PREVENTION OF CORROSION

DESCRIPTION

This invention relates to the prevention of corrosion in, generally aqueous, systems which are liable to come into contact with a corrosible metal surface. More particularly, it relates to compositions and methods of inhibiting corrosion in recirculating and other water systems, especially closed recirculating hot water or cooling systems which contain both ferrous and non-ferrous e.g. aluminium, components.

Corrosion in aqueous systems is caused largely by the oxygen and carbon dioxide which is dissolved in it. A large number of corrosion inhibitors have been added to such systems in order to prevent the dissolved gases from attacking the metal surfaces with which the system comes into contact. Amongst these vegetable tannins have been used; these are believed to act by forming an iron tannate protective film.

In boilers and steam condensate lines corrosion of steel is the principal problem. In contrast, in recirculating water systems, for example in household and industrial central heating systems and in cooling systems used in large diesel engines, it is becomming common to incorporate parts made of aluminium in the system. As a result Galvanic corrosion can also occur. Most known corrosion inhibitors including tannins, are largely ineffective in preventing corrosion of non-ferrous metals, even when used in large amounts. It has surprisingly been found, according to the present invention, that if a tannin is used in conjunction with a water-soluble salt of calcium or other Group II metal corrosion, in particular of non-ferrous metal, especially aluminium components, can be reduced markedly.

It will, of course, be appreciated that on an industrial scale and in larger diesel engines the water used is generally deionised so as to reduce scaling and other forms of fouling due to the presence of, for instance, calcium carbonate as well as silicates, sulphates and phosphates. Accordingly, it would not be appropriate to use ordinary hard water to supply the calcium ions.

According to the present invention there is provided a method of inhibiting corrosion in a, generally aqueous, liquid system which comprises incorporating in the system at least one vegetable tannin or a derivative thereof and a water soluble salt of a metal of Group II (A or B) of the Periodic Table.

Tannins are condensed polyphenolic materials of vegetable origin, optionally substituted with solubilising groups such as sulphonic acid groups. A particular tannin which is suitable for use in the present invention is a sulphited extract of naturally occurring catechol-based vegetable tannins.

Typical water-soluble salts which can be used include chlorides, nitrates and acetates but other salts having a solubility of at least about 30 g/l at 20° C. can also be used. The metals of these salts are typically zinc, magnesium and calcium, calcium being especially preferred.

It is, of course, possible to incorporate into the system, either separately or with one or more of the essential components of the composition, other ingredients such as corrosion inhibitors specific for non-ferrous metals such as copper, for instance azoles, especially benzotriazole, and dispersants, including lignin, as well as oxygen and carbon dioxide scavengers, typically hydroxylamines and neutralising amines. Indeed the presence of these scavengers and of the azoles can enhance the beneficial effect obtained. In general, amounts of the hydroxylamine are similar to those of the tannin while the weight ratio of hydroxylamine:amine (if used) is suitably from 0.001 to 10:1, especially about 1:1. The amount of triazole used is typically 3 to 300, especially 5 to 100, ppm and the amount of each of the hydroxylamine and neutralising amine is typically 10 to 5000, preferably from 500 to 3000, ppm.

The hydroxylamine compounds which may be used in the present invention are those having the formula

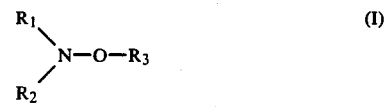

wherein $R_1, R_2$ and $R_3$ independently represent hydrogen, alkyl of 1 to 8 carbon atoms, aryl such as phenyl or tolyl or aryl (lower alkylene) such as benzyl, or a water soluble salt thereof. Typical hydroxylamines which can be used in the present invention include N,N-diethylhydroxylamine (DEHA), which is preferred, N,N-dimethylhydroxylamine, N-propylhydroxylamine, N-butylhydroxylamine, O-pentylhydroxylamine, N,N-dipropylhydroxylamine, N-heptylhydroxylamine, O-ethyl-N,N-diethylhydroxylamine, α and β benzylhydroxylamine, O-methyl N-propylhydroxylamine, N-octylhydroxylamine, N-methyl-N-propylhydroxylamine and N-hexylhydroxylamine. More than one hydroxylamine can, of course, be used.

The neutralising amine used is a volatile amine well known to those in the art. Such amines are conventionally added to react with dissolved carbon dioxide in the water. Typical such amines which can be used include morpholine, cyclohexylamine, diethylaminoethanol, dimethylpropanolamine, 2-amino-2-methyl-1-propanol, methoxypropylamine, 2-aminobutanol, and benzylamine. Further details are to be found in H H Uhlig, "Corrosion and Corrosion Control", pages 252-253, John Wiley & Sons Inc. (1963). Of these, 2-amino-2-methylpropanol (AMP) is preferred. Of course, mixtures of amines can be used.

A particularly preferred composition comprises DEHA, AMP and benzotriazole together with the tannin and calcium acetate, especially so as to provide in the system about 2000, 2000, 40, 2000 and 20 ppm, respectively i.e. a weight ratio of 100:100:2:100:1.

The components can of course, be added separately to the system or in a mixture of two or more of the components.

Accordingly the present invention also provides an anti-corrosive composition which is a tannin and a water soluble salt of a metal of Group IIA of the Periodic Table. The combination provides a suitable formulation of low toxicity. In general, the weight ratio of the salt, expressed as metal:tannin is from 0.0025 to 0.1:1, more preferably from 0.005 to 0.05:1.

In general, the level of the tannin in the system should be from 10 to 5,000 ppm, preferably from 500 to 3,000 ppm, while the concentration of the metal salt (as metal) is generally from 5 to 500 ppm, preferably from 10 to 100 ppm, and especially from 20 to 30 ppm.

Typically the formulation is dosed at 2% in base exchanged water. Typical concentrations of the ingredients in the formulation are as follows: tannin, hydroxylamine and neutralising amine 0.05 to 25%, especially 2.5 to 15%, triazole 0.015 to 1.5%, especially 0.025 to 0.5% and metal salt (as metal) 0.05 to 5%, especially 0.1 to 1%, preferably 0.15 to 0.3%, all percentages being by weight, active basis. Accordingly the amounts of tannin, hydroxylamine and neutralising amine are roughly equal while the weight ratio of tannin to triazole is generally from 0.1:3 to 5000:3, especially from 5:1 to 600:1. Thus the preferred formulation mentioned above contains about 10% of the tannin, DEHA and AMP, 0.2% of benzotriazole, 0.38% of calcium acetate and 0.5% acetic acid (to adjust the pH to 8.5) (by weight, active basis).

A further advantage of the method and compositions of the present invention is that they are effective in ethylene glycol/water systems which are, of course, known to be particularly corrosive as well as in other alcoholic systems used as functional fluids.

Suitable alcohols for this purpose are saturated aliphatic hydroxy compounds or mixtures thereof, in particular methyl, ethyl, and propyl alcohols and other monohydroxy alcohols as well as dihydroxy, trihydroxy, and other polyhydroxy alcohols such as ethylene glycol, propylene glycol, diethylene glycol, dipropylene glycol, other alkylene glycols, and glycerol. The alcohol is usually diluted with water to obtain a mixture of the desired freezing point or other functional property. The alcohol generally comprises from about 10 to about 60 percent by weight of the fluid. A water soluble or miscible alcohol having about 1 to 5 carbon atoms such as methyl, ethyl, or propyl alcohol, ethylene glycol, or propylene glycol is preferably employed. The functional fluids may be used, for example, in the internal combustion engines of automobiles and trucks, liquid-cooled aircraft engines, snow-melting systems, refrigeration systems, diesel locomotive engines, automatic sprinkler systems, brake and other hydraulic systems, heating systems, air conditioning systems, and deicing systems.

The following Examples further illustrate the present invention. In these Examples metal coupons were fixed in a glass tube assembly through which water heated to 80° C. was circulated by means of a pump. The assembly formed part of a closed system provided with an expansion tank open to the atmosphere. The specimens were cleaned and weighed before and after the tests and the average corrosion rate in mils per year calculated from the weight loss recorded.

In all these Examples the tannin used was a sulphited extract of naturally occurring catechol-based vegetable tannins.

EXAMPLES 1–14

Widnes mains water treated with a base exchange unit to provide a total hardness of less than 1 mg per liter, M.alkalinity 110 mg per liter was used. The pH of this water was adjusted to 8.5 with acetic acid. The additives specified in Table 1 below were added in the amounts specified and the corrosion rates determined after three days at 80° C.

| Example No. | BASE EXCHANGE WATER AT 80° C. FOR 3 DAYS | | | | | | | | |
|---|---|---|---|---|---|---|---|---|---|
| | Dosage rate, mg./l | | | | | Corrosion rate, mpy. | | | |
| | DEHA | AMP | Benzotriazole | Compound Q* | Calcium as Ca | Mild Steel | Copper | Brass | Aluminium |
| 1 | — | — | — | — | — | 8.8 | 0.2 | 0.1 | 15.8 |
| 2 | — | — | — | — | 20 | 15.1 | 0.2 | 0.1 | 20.8 |
| 3 | — | — | 40 | — | — | 19.8 | 1.2 | 2.8 | 5.8 |
| 4 | — | — | 40 | — | 20 | 19.5 | 0.1 | 0.1 | 22.0 |
| 5 | 2000 | — | — | — | — | 3.9 | 0.2 | 0.2 | 84.0 |
| 6 | 2000 | — | — | — | 20 | 2.9 | 0.2 | 0.2 | 77.0 |
| 7 | — | 2000 | — | — | — | 2.1 | 0.2 | 0.5 | 49.0 |
| 8 | — | 2000 | — | — | 20 | 2.4 | 2.5 | 1.4 | 23.4 |
| 9 | 2000 | 2000 | — | — | — | 0.4 | 0.3 | 0.4 | 55.2 |
| 10 | 2000 | 2000 | — | — | 20 | 7.4 | 0.2 | 0.4 | 63.1 |
| 11 | 2000 | 2000 | 40 | 2000 | 20 | 0.5 | 0.3 | 0.1 | 0.7 |
| 12 | 2000 | 2000 | 40 | 2000 | 20 | 11.2 | 0.2 | 0.1 | 451.3 |
| 13 | 2000 | 2000 | 40 | 2000 | 20 | 15.6 | 0.1 | 0.2 | 34.7 |
| 14 | 2000 | 2000 | 40 | 2000 | 20 | 1.5 | 0.1 | 0.1 | 63.9 |

*Example No.   Compound Q
- 11   Tannin
- 12   Pyrogallol
- 13   Lignosulphonate
- 14   Polyacrylic acid These results show the effectiveness of the combination of the metal salt and the tannin. Examples 12–14 show the specific nature of the tannin in combining with the metal salt.

EXAMPLES 15–22

These Examples show the effect of varying the concentration of the metal salt and also the effect of using a magnesium salt.

EXAMPLES 23–26

These examples illustrate further the comparison between calcium and magnesium salt, dosed as the chloride, in combination with the tannin.

TABLE II

| Example No. | BASE EXCHANGED WATER AT 80° C. FOR 3 DAYS | | | | | | | | |
|---|---|---|---|---|---|---|---|---|---|
| | Dosage Rate, mg/l | | | | | Corrosion Rate, mpy | | | |
| | DEHA | AMP | Calcium as Ca | Benzotriazole | Tannin | Mild Steel | Copper | Brass | Aluminium |
| 1 | — | — | — | — | — | 8.8 | 0.2 | 0.1 | 15.8 |
| 3 | — | — | — | 40 | — | 19.8 | 1.2 | 2.8 | 5.8 |
| 15 | — | — | — | — | 2000 | 7.1 | 1.2 | 3.4 | 13.3 |
| 16 | — | — | — | 40 | 2000 | 9.2 | 0.1 | 0.1 | 8.7 |
| 17 | 2000 | 2000 | — | 40 | 2000 | 0.8 | 0.2 | 0.2* | 4.2 |

TABLE II-continued

| | BASE EXCHANGED WATER AT 80° C. FOR 3 DAYS | | | | | | | | |
|---|---|---|---|---|---|---|---|---|---|
| Example | Dosage Rate, mg/l | | | | | Corrosion Rate, mpy | | | |
| No. | DEHA | AMP | Calcium as Ca | Benzotriazole | Tannin | Mild Steel | Copper | Brass | Aluminium |
| 18 | 2000 | 2000 | 12 | 40 | 2000 | 0.4 | 0.3 | 0.6 | 0.9 |
| 11 | 2000 | 2000 | 20 | 40 | 2000 | 0.5 | 0.3 | 0.1 | 0.7 |
| 19 | 2000 | 2000 | 28 | 40 | 2000 | 0.7 | 0.3 | 0.1 | 0.4 |
| 20 | 2000 | 2000 | 36 | 40 | 2000 | 0.8 | 0.8 | 0.7 | 0.9 |
| 21 | 2000 | 2000 | 80 | 40 | 2000 | 1.2 | 0.5 | 2.0 | 1.0 |
| 22 | 2000 | 2000 | 12* | 40 | 2000 | 1.1 | 0.1 | 0.2 | 1.2 |

*MgSO$_4$

TABLE III

| | | | BASE EXCHANGED WATER AT 80° C. FOR 3 DAYS | | | | | | | | | |
|---|---|---|---|---|---|---|---|---|---|---|---|---|
| | | | Dosage Rate mg/l | | | | | | Corrosion Rate, mpy | | | |
| Example No. | Water Quality | Temperature °C. | DEHA | AMP | Benzo-triazole | Tannin | Calcium as Ca | Magnesium as Mg | Mild Steel | Copper | Brass | Aluminium |
| 1 | Base Ex | 80 | — | — | — | — | — | — | 8.8 | 0.2 | 0.1 | 15.8 |
| 15 | Base Ex | 80 | — | — | — | 2000 | — | — | 7.1 | 1.2 | 3.4 | 13.3 |
| 16 | Base Ex | 80 | — | — | 40 | 2000 | — | — | 9.2 | 0.1 | 0.1 | 8.7 |
| 23 | Base Ex | 80 | — | — | — | 2000 | 20 | — | 7.1 | 0.1 | 0.1 | 10.0 |
| 24 | Base Ex | 80 | — | — | 40 | 2000 | 20 | — | 5.0 | 0.2 | 0.2 | 4.6 |
| 11 | Base Ex | 80 | 2000 | 2000 | 40 | 2000 | 20 | — | 0.5 | 0.3 | 0.1 | 0.7 |
| 25 | Base Ex | 80 | 2000 | 2000 | 40 | 2000 | — | 12 | 1.1 | 0.1 | 0.2 | 1.2 |
| 26 | Base Ex | 80 | 2000 | 2000 | 40 | 2000 | — | 20 | 1.0 | 0.1 | 0.1 | 1.1 |

EXAMPLES 27 and 28

In these Examples a 1:1 mixture of the base exchanged Widnes mains water as used in the preceding Examples 1–26 and ethylene glycol was used. Again, the pH of the water was adjusted to 8.5 with acetic acid and the calcium was added as its acetate. Table IV below gives the results obtained after three days at 80° C.

TABLE IV

| Example | Corrosion Rate, mpy | | | |
|---|---|---|---|---|
| No. | Mild Steel | Copper | Brass | Aluminium |
| 27 No Additives | 3.8 P | 0.3 | 2.0 | 2.0 P |
| 28 Additives | 0.5 | 0.2 | 0.2 | 0.4 |

In Example 28 the additives were DEHA, AMP and tannin each 2000 mg/l, benzotriazole 40 mg/l and calcium 20 mg/l.

In the Table the letter "P" signifies that pitting corrosion has taken place. Thus these Examples show that the composition and method of the present invention are extremely effective in reducing not only general corrosion but also in stopping pitting corrosion in ethylene glycol/water mixtures.

EXAMPLES 29–30

Examples 27 and 28 were repeated but using 50:50 mixture of the base exchanged water and methanol. The results obtained after 3 days at 70° C. are shown below.

| Example | Corrosion rate, mpy | | | |
|---|---|---|---|---|
| No. | Mild Steel | Copper | Brass | Aluminium |
| 29 No Additives | 30.0 | 0.1 | 0.3 | 1.6 |
| 30 Additives | 1.1 | 0.1 | 0.2 | 1.2 |

These Examples clearly illustrate the effectiveness of the formulation in reducing corrosion in a functional fluid.

We claim:

1. A method of inhibiting corrosion in a liquid system which comprises adding to the system at least one vegetable tannin or a derivative thereof, a water soluble salt of a metal of Group II in the Periodic Table, a triazole, a hydroxylamine and a neutralizing amine, together in an amount effective to substantially reduce corrosion of system components; wherein said tannin is added in an amount of from about 10 ppm to about 5000 ppm; wherein said hydroxylamine is added in an amount of from about 10 ppm to about 5000 ppm; wherein said neutralizing amine is added in an amount of from about 10 ppm to about 5000 ppm; and wherein said salt is added in an amount of from about 5 ppm to about 500 ppm such that the corrosion rate of any aluminum components incorporated in the system and contacted with the system liquid is substantially less than their corrosion rate without said salt addition.

2. A method according to claim 1 in which the salt is a salt of zinc, magnesium or calcium.

3. A method according to claim 2 in which the salt is calcium acetate.

4. A method of inhibiting corrosion in a liquid system wherein the liquid contacts system components made of aluminum which comprises adding to the system at least one vegetable tannin or a derivative thereof, a water soluble magnesium salt, a hydroxylamine, a neutralizing amine and a triazole, together in an amount effective to substantially reduce corrosion of system components; wherein said tannin is added in an amount of from about 10 ppm to about 5000 ppm and said salt is added in an amount of from about 5 ppm to about 500 ppm such that the corrosion rate of aluminum system components is substantially less than their corrosion rate without said salt addition.

5. A method according to claim 4 in which the triazole is benzotriazole.

6. A method according to claim 4 in which the triazole is incorporated in an amount from 5 to 100 ppm.

7. A method according to claim 1 in which the hydroxylamine has the formula:

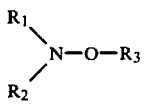

wherein R₁, R₂ and R₃ independently represent hydrogen, alkyl of 1 to 8 carbon atoms, aryl or aryl (lower alkylene), or a water soluble salt thereof.

8. A method according to claim 7 in which the hydroxylamine is N,N-diethyl-hydroxylamine.

9. A method according to claim 4 in which the hydroxylamine has the formula:

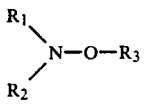

wherein R₁, R₂ and R₃ independently represent hydrogen, alkyl of 1 to 8 carbon atoms, aryl or aryl (lower alkylene), or a water soluble salt thereof.

10. A method according to claim 9 in which the hydroxylamine is N,N-diethyl-hydroxylamine.

11. A method according to claim 1 in which the neutralising amine is 2-amino-2-methylpropanol.

12. A method according to claim 4 in which the neutralising amine is 2-amino-2-methylpropanol.

13. A method according to claim 1 in which the amount of the hydroxylamine and neutralising amine added is from 500 to 3,000 ppm, the weight ratio of hydroxylamine:neutralising amine being from 0.001 to 10:1.

14. A method according to claim 4 in which the amount of the hydroxylamine and neutralising amine added is from 500 to 3,000 ppm, the weight ratio of hydroxylamine:neutralising amine being from 0.001 to 10:1.

15. A method of inhibiting corrosion in a liquid system wherein the liquid contacts system components made of aluminum which comprises adding to the system at least one vegetable tannin or a derivative thereof, a triazole, and a water soluble salt of calcium, together in an amount effective to substantially reduce corrosion of system components; wherein said tannin is added in an amount of from about 10 ppm to about 5000 ppm and said salt is added in an amount of from about 5 ppm to about 500 ppm such that the corrosion rate of aluminum system components is substantially less than their corrosion rate without said salt addition.

16. The method according to claim 1 in which the tannin is a sulphited extract of one or more naturally occurring catechol-based vegetable tannins.

17. A method according to claim 4 in which the tannin is a sulphited extract of one or more naturally occurring catechol-based vegetable tannins.

18. A method according to claim 15 in which the tannin is a sulphited extract of one or more naturally occurring catechol-based vegetable tannins.

19. A method according to claim 15 in which the system is an aqueous system.

20. A method according to claim 19 in which the aqueous system is a closed system.

21. A method according to claim 1 in which the salt is a chloride, nitrate or acetate.

22. A method according to claim 4 in which the salt is a chloride, nitrate or acetate.

23. A method according to claim 15 in which the salt is a chloride, nitrate or acetate.

24. A method according to claim 15 which further comprises adding an additional corrosion inhibitor.

25. A method according to claim 1 in which the tannin is incorporated in an amount from 500 to 3,000 ppm.

26. A method according to claim 4 in which the tannin is incorporated in an amount from 500 to 3,000 ppm.

27. A method according to claim 15 in which the tannin is incorporated in an amount from 500 to 3,000 ppm.

28. A method according to claim 1 in which the salt is incorporated in an amount from 10 to 100 ppm.

29. A method according to claim 4 in which the salt is incorporated in an amount from 10 to 100 ppm.

30. A method according to claim 15 in which the salt is incorporated in an amount from 10 to 100 ppm.

31. A method according to claim 30 in which the salt is incorporated in amount from 20 to 30 ppm.

32. A method according to claim 15 in which the system is an alcoholic system.

33. A method according to claim 32 in which the alcohol is methyl, ethyl or propyl alcohol, ethylene glycol, propylene glycol, diethylene glycol, dipropylene glycol or glycerol.

34. A method according to claim 33 in which the system comprises 10 to 50% by weight alcohol and 90 to 40% by weight of water.

35. An anti-corrosive composition which comprises a tannin and a water soluble salt of a metal of Group II of the Periodic Table, a triazole, a hydroxylamine and a neutralizing amine; wherein the weight ratio of the salt, expressed as the metal, to tannin is from about 0.0025:1 to about 0.1:1.

36. A composition according to claim 35 in which the salt is a zinc, magnesium or calcium salt.

37. A composition according to claim 36 in which the salt is calcium acetate.

38. An anti-corrosive composition which comprises a tannin and a water soluble magnesium salt, a hydroxylamine, a neutralizing amine and a triazole; wherein the weight ratio of the salt, expressed as the magnesium, to tannin is from about 0.0025:1 to about 0.1:1.

39. A composition according to claim 38 in which the the triazole is benzotriazole.

40. A composition according to claim 35 in which the hydroxylamine has the formula:

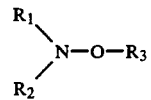

wherein R₁, R₂, and R₃ independently represent hydrogen, alkyl of 1 to 8 carbon atoms, aryl or aryl (lower alkylene), or a water soluble salt thereof.

41. A composition according to claimm 40 in which the hydroxylamine is N,N-diethyl-hydroxylamine.

42. A composition according to claim 38 in which the hydroxylamine has the formula:

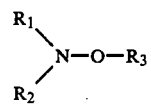

wherein $R_1$, $R_2$, and $R_3$ independently represent hydrogen, alkyl of 1 to 8 carbon atoms, aryl or aryl (lower alkylene), or a water soluble salt thereof.

43. A composition according to claim 42 in which the hydroxylamine is N,N-diethyl-hydroxylamine.

44. A composition according to claim 35 in which the neutralising amine is 2-amino-2-methylpropanol.

45. A composition according to claim 38 in which the neutralising amine is 2-amino-2-methylpropanol.

46. A composition according to claim 35 which further comprises another corrosion inhibiting material.

47. A composition according to claim 38 which further comprises another corrosion inhibiting material.

48. An anti-corrosive composition which consists essentially of a tannin, a triazole, and a water soluble salt of calcium; wherein the weight ratio of the salt, expressed as calcium, to tannin is from about 0.0025:1 to about 0.1:1.

49. A composition according to claim 35 which comprises about 0.05 to about 25% by weight of tannin, hydroxylamine and neutralising amine, about 0.015 to about 1.5% by weight of triazole and about 0.05 to about 5% by weight (as metal) of the salt, the weight ratio of tannin-triazole being from about 0.1:3 to about 5000:3.

50. A composition according to claim 49 which comprises about 2.5 to about 15% by weight of tannin, hydroxylamine and neutralising amine, about 0.025 to about 0.5% by weight of triazole and about 0.1 to about 1% by weight (as metal) of metal salt, the weight ratio of tannin:triazole being from about 5:1 to about 600:1.

51. A composition according to claim 50 which comprises about 10% by weight of tannin, N,N-diethylhydroxylamine and 2-amino-methylpropanol, about 0.2% by weight of benzotriazole, about 0.3% by weight of calcium acetate and about 0.5% by weight of acetic acid.

52. A composition according to claim 35 in which the tannin is a sulphited extract of one or more naturally occurring catechol-based vegetable tannins.

53. A composition according to claim 38 in which the tannin is a sulphited extract of one or more naturally occurring catechol-based vegetable tannins.

54. A composition according to claim 48 in which the tannin is a sulphited extract of one or more naturally occurring catechol-based vegetable tannins.

55. A composition according to claim 35 in which the salt is a chloride, nitrate or acetate.

56. A composition according to claim 38 in which the salt is a chloride, nitrate or acetate.

57. A composition according to claim 48 in which the salt is a chloride, nitrate or acetate.

58. A composition according to claim 35 in which the weight ratio of the salt, expressed as metal:tannin is from 0.005:1 to 0.05:1.

59. A composition according to claim 38 in which the weight ratio of the salt, expressed as metal:tannin is from 0.005:1 to 0.05:1.

60. A composition according to claim 48 in which the weight ratio of the salt, expressed as metal:tannin is from 0.005:1 to 0.05:1.

61. A composition according to claim 48 which further comprises an alcohol.

62. A composition according to claim 61 in which the alcohol is ethyl, methyl or propyl alcohol, ethylene glycol or propylene glycol.

63. A composition according to claim 62 which is in the form of a functional fluid for use in an internal combustion engine, a brake or other hydraulic system, a heating system or an air conditioning system.

64. A method according to claim 1 wherein the liquid system is an aqueous system in which the water used is deionized or base exchanged such that it is substantially free of hardness before addition of the corrosion inhibiting ingredients.

65. A method according to claim 4 wherein the liquid system is an aqueous system in which the water used is deionized or base exchanged such that it is substantially free of hardness before addition of the corrosion inhibiting ingredients.

66. A method according to claim 15 wherein the liquid system is an aqueous system in which the water used is deionized or base exchanged such that it is substantially free of hardness before addition of the corrosion inhibiting ingredients.

* * * * *